(12) United States Patent
Schonhardt

(10) Patent No.: US 8,820,774 B2
(45) Date of Patent: Sep. 2, 2014

(54) CONSTRUCTION CART

(76) Inventor: Mike Schonhardt, Waconia, MN (US)

( * ) Notice: Subject to any disclaimer, the term of this patent is extended or adjusted under 35 U.S.C. 154(b) by 196 days.

(21) Appl. No.: 13/546,422

(22) Filed: Jul. 11, 2012

(65) Prior Publication Data

US 2014/0015229 A1    Jan. 16, 2014

(51) Int. Cl.
*B62B 1/00* (2006.01)
(52) U.S. Cl.
USPC ......... 280/641; 280/645; 280/656; 280/47.18
(58) Field of Classification Search
CPC ........... B62B 1/00; B62B 1/008; B62B 1/04; B62B 1/042; B62B 1/10; B62B 1/12; B62B 1/125; B62B 1/18; B62B 1/20; B62B 1/208; B62B 1/262; B62B 1/268; B62B 5/065; B62B 5/067
USPC ................ 280/641, 645, 656, 47.131, 47.17, 280/47.18, 47.24, 47.28, 47.315, 47.33
See application file for complete search history.

(56) References Cited

U.S. PATENT DOCUMENTS

| | | |
|---|---|---|
| 122,565 A | 1/1872 | Carre |
| 167,715 A | 9/1875 | Weaver |
| 292,680 A | 1/1884 | Rausch |
| 296,019 A | 4/1884 | Kinsley |
| 308,362 A * | 11/1884 | Hughes ........................ 280/659 |
| 365,569 A | 6/1887 | Blake |
| 498,056 A | 5/1893 | Higgins et al. |
| 698,213 A | 4/1902 | McGarry |
| 937,657 A | 10/1909 | Streich |
| 970,787 A | 9/1910 | Brown |
| 1,105,631 A | 8/1914 | Drain |
| 2,171,068 A | 8/1939 | Masters |
| 2,424,692 A | 7/1947 | Harshberger |
| 2,427,803 A * | 9/1947 | Mueller ..................... 280/47.29 |
| 2,536,567 A | 1/1951 | Peters et al. |
| 3,352,379 A | 11/1967 | Riggs |
| 3,578,182 A | 5/1971 | Harvey |
| 3,669,464 A | 6/1972 | Linzmeier |
| 4,266,791 A | 5/1981 | Myers |
| 4,561,674 A * | 12/1985 | Alessio ......................... 280/655 |
| 4,588,197 A * | 5/1986 | Benedetto, Jr. ............. 280/47.18 |
| 4,958,846 A * | 9/1990 | Greenberg .................... 280/652 |
| 5,002,304 A | 3/1991 | Carrigan, Jr. |
| 5,004,263 A * | 4/1991 | Hubbard ....................... 280/645 |
| 5,328,192 A * | 7/1994 | Thompson ................. 280/47.24 |
| 5,332,243 A | 7/1994 | Berry |
| 5,433,291 A | 7/1995 | Shoestock, Sr. |
| 5,673,928 A * | 10/1997 | Jury .............................. 280/645 |
| 6,036,219 A | 3/2000 | Oefelein et al. |
| 6,283,496 B1 * | 9/2001 | Dickmann .................... 280/652 |
| 6,450,514 B1 | 9/2002 | Ronca |
| 6,733,026 B1 * | 5/2004 | Robberson et al. ........ 280/415.1 |
| 6,793,223 B2 | 9/2004 | Ondrasik et al. |
| 6,834,882 B1 * | 12/2004 | Boyd ........................... 280/656 |
| 6,902,175 B1 | 6/2005 | Clavey |
| 6,991,250 B2 * | 1/2006 | Lindsey et al. ............... 280/651 |
| 7,017,940 B2 * | 3/2006 | Hatfull ......................... 280/652 |
| 7,389,996 B2 * | 6/2008 | Dube et al. ..................... 280/35 |
| 7,448,632 B1 * | 11/2008 | Nieto ......................... 280/47.24 |

(Continued)

*Primary Examiner* — Katy M Ebner
(74) *Attorney, Agent, or Firm* — Nikolai & Mersereau, P.A.; Thomas J. Nikolai

(57) ABSTRACT

A foldable cart is described. The cart may be collapsed for transport in the bed of a pickup truck to a jobsite. Upon reaching the jobsite, the cart is removed from the pickup truck, unfolded and used to transport construction materials.

19 Claims, 4 Drawing Sheets

(56) References Cited

U.S. PATENT DOCUMENTS

| | | | |
|---|---|---|---|
| 7,891,697 B1* | 2/2011 | Fahrbach | 280/656 |
| 7,963,531 B2* | 6/2011 | Panigot | 280/40 |
| 8,448,978 B2* | 5/2013 | Alvarino | 280/656 |
| 2002/0105169 A1 | 8/2002 | Dahl | |
| 2005/0040618 A1 | 2/2005 | Beatty | |
| 2005/0194765 A1* | 9/2005 | Easterling | 280/656 |
| 2006/0207831 A1 | 9/2006 | Moore et al. | |
| 2007/0216118 A1* | 9/2007 | Jackson et al. | 280/47.131 |
| 2007/0235255 A1 | 10/2007 | Wallace et al. | |
| 2008/0073871 A1* | 3/2008 | Winkel | 280/415.1 |

\* cited by examiner

CONSTRUCTION CART

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates to carts and, more particularly, to carts adapted for transporting a variety of elongate materials at a construction site.

II. Related Art

Since the invention of the wheel, various types of carts have been employed to transport construction materials. Examples of such carts presently used include (1) flatbed carts having four wheels, a horizontal deck and an upright handle; (2) carts having a horizontal deck like a flatbed cart and upright sides supported by the horizontal deck; (3) two-wheeled dollies; and (4) wheelbarrows.

Known carts, however, have serious drawbacks when transporting at a job site elongate construction materials which are often ten feet long or longer. Wheelbarrows and two-wheeled dollies are not intended to perform such tasks and do not work well when performing such tasks. Likewise, flatbed carts or flatbed carts with upright sides are typically either too short to be particularly useful when transporting long items. Such carts also typically have wheels too small to transport such materials over the uneven terrain often found at job sites. While larger and taller carts are known, these are not often used because of the difficulty encountered and resources required to transport such carts to a job site.

SUMMARY OF THE INVENTION

In view of the disadvantages of heretofore-known carts, the present invention provides a highly advantageous cart which is big enough to transport virtually any elongate material typically employed at a job site, is narrow enough to fit through gates yet stable, and is foldable or collapsible so that it can easily be transported in the back of a pickup truck. Pickup trucks are typically owned by many residential contractors.

More specifically, a cart for transporting building materials is disclosed. The cart includes a frame comprising a middle frame section, a front frame section, and a rear frame section. The middle frame section comprises a first longitudinal frame member having a front end and a back end, a second longitudinal frame member having a front end and a back end and a support assembly comprising four upright hollow supports, each having an open top, and four cross braces. The first and second supports are fastened to and extend upwardly from the first longitudinal frame member. The third and fourth supports are fastened to and extend upwardly from the second longitudinal frame member. The first cross brace extends between the first and second upright supports. The second cross brace extends between the third and fourth upright supports. The third cross brace extends between the first and third upright supports. The fourth cross brace extends between the second and fourth upright supports.

The front frame section comprises first and second rails and at least one brace. The first rail has a back end pivotally connected to the second support of the support assembly and a front end coupled to the brace. The second rail has a back end pivotally connected to the fourth support of the support assembly and a front end coupled to the brace. As such, the front frame section is pivotal between a folded position in which the front frame overlies the middle frame section and a deployed position in which the front frame extends in a cantilevered fashion from and in front of the middle frame section. When in the deployed position, the first rail is supported by the first cross brace of the support assembly and the second rail is supported by the second cross brace of the support assembly.

The rear frame section comprises first and second spaced apart channel beams. Each channel beam is hollow and has an open back end. Each channel beam also has a front end pivotally connected to the back end of one of the longitudinal frame members of the middle frame section. As such, the rear frame section is pivotal between a folded position in which the rear frame section overlies the middle frame section and a deployed position in which the rear frame section extends from and behind the middle frame section. When the rear frame section is in its deployed position, the first channel beam of the rear frame section extends from the first longitudinal member of the middle frame section at an angle of about 180°. Likewise, the second channel member extends from the second longitudinal member at an angle of about 180°.

When in its deployed configuration, the frame is supported above the ground by a wheel assembly and a leg assembly. More specifically, the wheel assembly includes a transverse axle coupled to the middle frame section near the front end of the first and second longitudinal frame members. A pair of wheels is coupled to the axle for rotation about the axle. The leg assembly is coupled to the rear frame section. The leg assembly comprises a pair of cross braces extending between the channel beams of the rear frame section, each cross brace having a first end secured to one of the channel beams and a second end secured to the other of the channel beams. A first leg is coupled to each of the cross braces near the first end of the cross braces and a second leg is coupled to each of the cross braces near the second end of the cross braces. As noted above, the leg assembly cooperates with the wheels to support the cart when the cart is at rest and the rear frame section is in the deployed position.

The cart also includes a handle assembly including a first handle member received in and extending rearwardly from the first channel beam of the rear frame section and a second handle member received in and extending rearwardly from the second channel beam of the rear frame section. The handle members telescope independently of each other with respect to the rear frame section permitting the length of the handles to be adjusted independently. The handle is locked in a desired position with respect to the associated channel beam by aligning a hole in the channel beam with one of a plurality of holes in the handle and then inserting a pin through the aligned holes. This same locking arrangement is used with respect to both handles and both channel beams.

Also disclosed are material support slings which support materials horizontally and support posts which support materials on the cart laterally. Various pockets are incorporated into the frame members which are used to couple the slings and lateral support posts to the frame in a selected fashion.

When the handles are retracted into the channel members and the front and rear frame members are folded to overlie the middle frame section, the overall length width of the cart is such that it will easily fit in the bed of a standard pickup truck with the gate of the pickup truck closed for transport. When the handles, front frame section and rear frame section are in their deployed positions, the cart provides a long enough surface to easily transport elongate items such as lumber, pipe, rolls of carpet, rolls of house wrap and other building materials about the job site.

DETAILED DESCRIPTION

Figure 1:
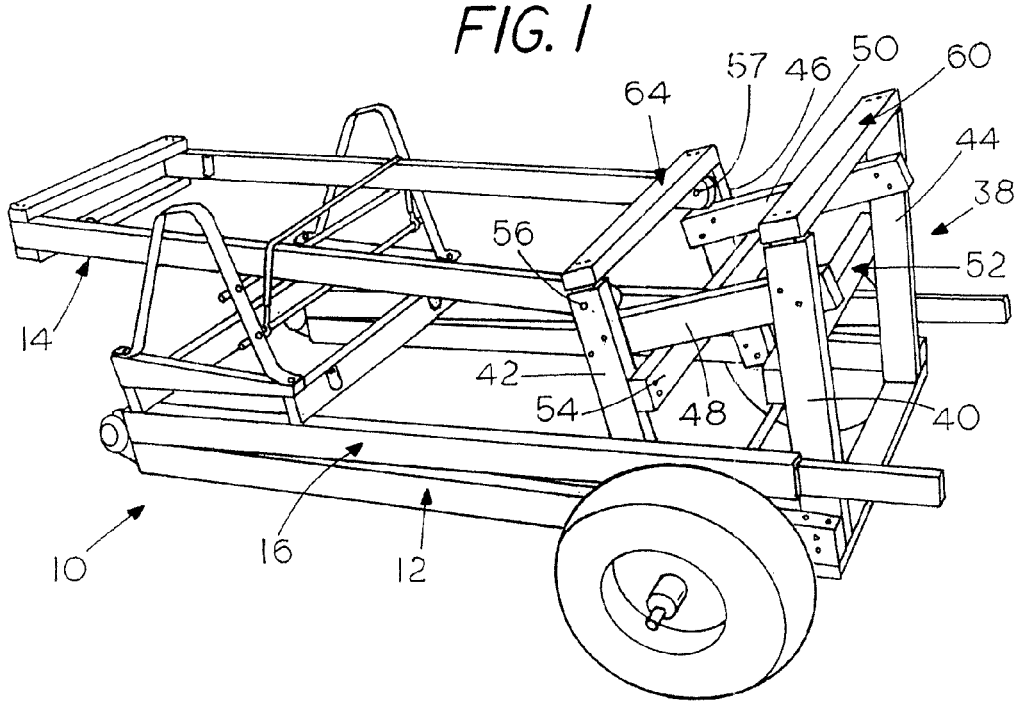
FIG. 1 is a perspective view showing a cart in its folded condition.
Figure 2:
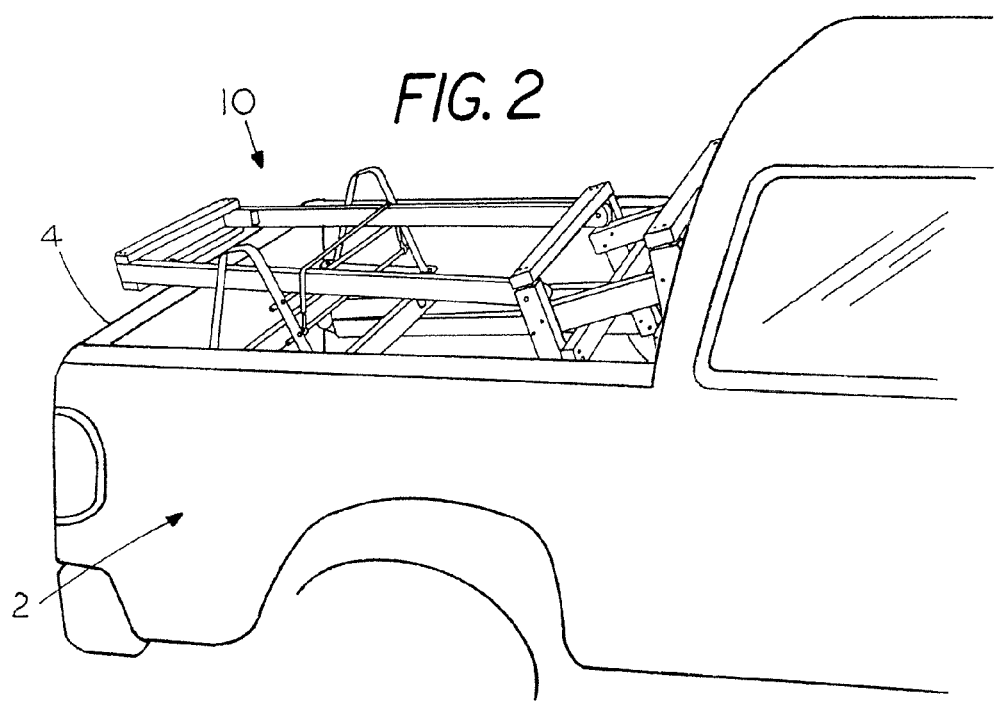
FIG. 2 is a perspective view of the cart of FIG. 1 in its folded condition positioned in the bed of a pickup truck.
Figure 3:
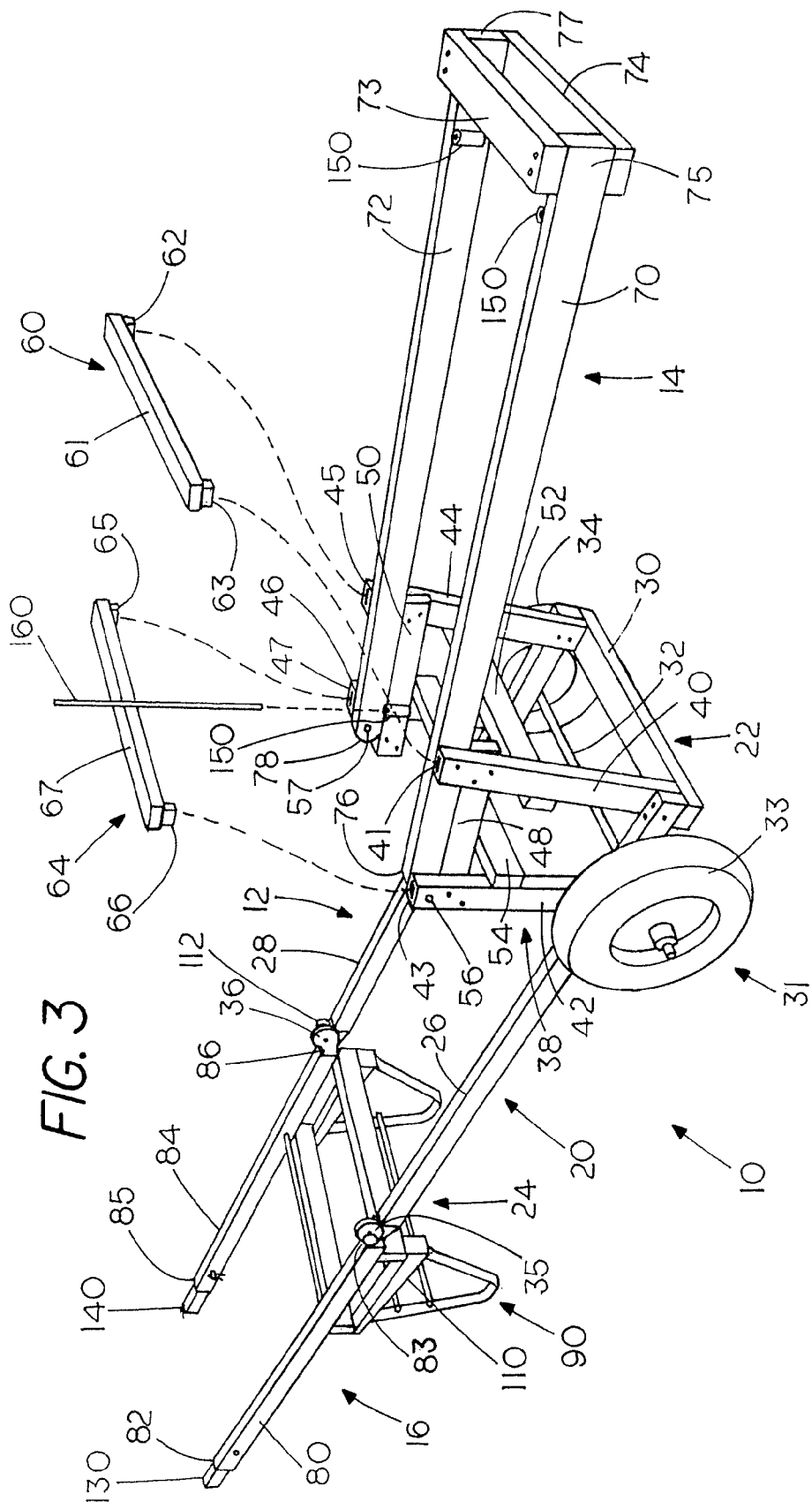
FIG. 3 is a perspective view of the cart of FIG. 1 in its unfolded condition.

In one embodiment the foldable cart 10 comprises three frame sections—a middle frame section 12, a front frame section 14 and a rear frame section 16. In FIG. 1, the three frame sections are shown in their folded configuration. As shown in FIG. 2, when the frame sections are in their folded configuration, the cart 10 can easily be transported in the bed of a pickup truck 2 even with the tailgate 4 of the pickup truck 2 closed. FIG. 3 shows the three frame sections of cart 10 in their unfolded configuration, resting on the ground and ready for use to haul lumber of other construction materials from one location to another at a job site.

As illustrated, the middle frame section 12 of the cart 10 comprises a base 20 and a support assembly 38. The base 20 has a front 22 where the support assembly 38 is joined to base 20. The base also has a back 24 where the rear frame section 16 is joined to the middle frame section 12.

The base 20 of the middle frame section 12 comprises a first longitudinal frame member 26 and a second longitudinal frame member 28. As shown, longitudinal frame members 26 and 28 are spaced from each other and extend parallel to each other from the front 22 to the back 24 of the base 20. The base 20 also includes a traverse brace 30 extending between and attached to the longitudinal frame members 26 and 28 proximate the front 22 of base 20.

The support assembly 38 includes four upright hollow supports 40, 42, 44 and 46, each having an open top 41, 43, 45 and 47 respectively. The first upright hollow support 40 is attached to and extends upwardly from first longitudinal frame member 26 proximate the front of the first longitudinal frame member 26. The second upright hollow support 42 is also attached to, and also extends upwardly from, the first longitudinal frame member 26, but about a foot back along the first longitudinal frame member 26 from the first upright hollow support 40. The third upright hollow support 44 is attached to and extends upwardly from the second longitudinal frame member 28 proximate the front of frame member 28. The fourth upright hollow support 46 is also attached to, and also extends upwardly from, the second longitudinal frame member 28, but about a foot back along the second longitudinal frame member 28 from the third upright hollow support 44.

The support assembly 38 of the middle frame section 12 also includes four cross braces 48, 50, 52 and 54. The first cross brace 48 extends between and is joined at its opposite ends to the first and second upright hollow supports 40 and 42. The second cross brace 50 extends between and is joined at its opposite ends to the third and fourth upright hollow supports 44 and 46. The third cross brace 52 extends between and has opposite ends joined to the first and third upright hollow supports 40 and 44. The fourth cross brace 54 extends between and has opposite ends joined to the second and fourth upright hollow supports 42 and 46. As so configured, the support assembly 38 is capable of supporting the front frame section 14.

Front frame section 14 comprises a first longitudinal rail 70, a second longitudinal rail 72, a first brace 73, and a second brace 74. Longitudinal rails 70 and 72 each have a front end (75 and 77, respectively) and a back end (76 and 78, respectively). Longitudinal rails 70 and 72 are also spaced apart and extend from their fronts to their backs in a substantially parallel manner. The first brace 73 extends between and is joined to the top of the first and second rails 70 and 72 proximate the fronts 75 and 77 of the rails. The second brace 74 extends between and is joined to the bottom of the first and second rails 70 and 72 also proximate the fronts 75 and 77 of the rails.

Figure 4:
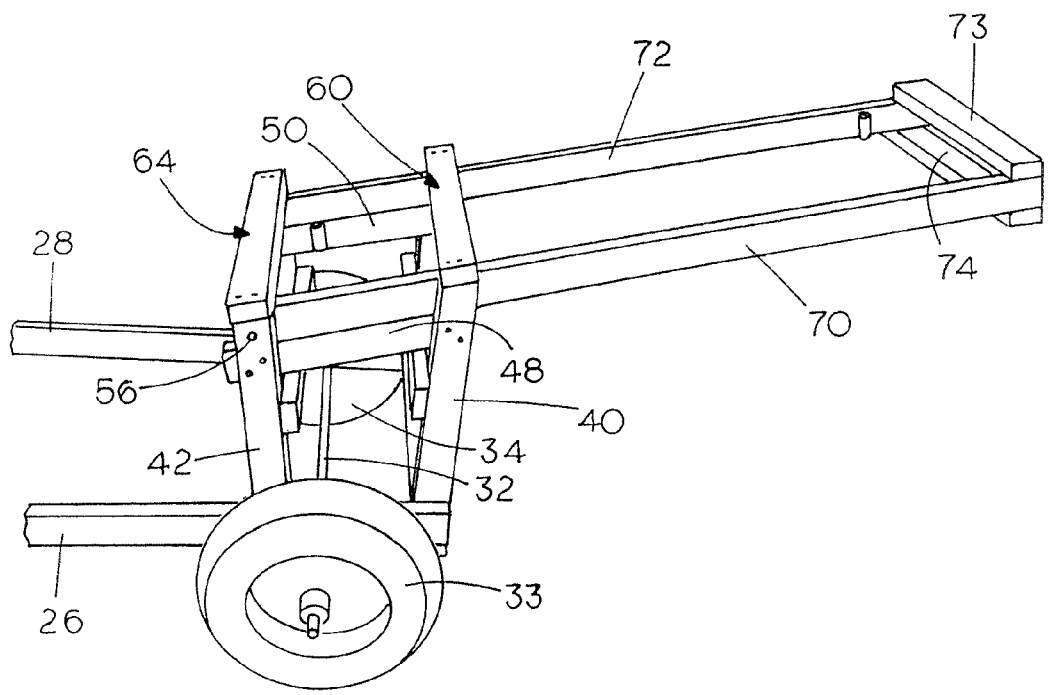
FIG. 4 is a perspective view showing the forward portion of the cart of FIG. 1.

The front frame section 14 is joined to the middle frame section 12 using first and second hinges 56 and 57. As shown, hinge 56 is essentially a bolt which connects the second upright hollow support 42 of the support assembly 38 of the middle frame section 12 to the first rail 70 of the front frame section 14. More specifically, the bolt passes through aligned holes near the top of the second hollow support 42 and the back end 76 of the first rail 70. Any suitable means may be employed to secure the bolt in place, e.g., a nut, cotter pin or the like. A second hinge 57 is likewise employed to connect the back end 78 of the second rail 72 of the front frame section to the fourth upright hollow support 46 of the support assembly 38 of the middle frame section 12. Hinges 56 and 57 permit the front frame section 14 to be pivoted between the folded position illustrated on FIGS. 1 and 2 and the deployed position illustrated in FIG. 3. The reader should note that when the front frame section 14 is in its deployed position, the bottom of first rail 70 engages the top of first cross brace 48 and the bottom of the second rail 72 engages the top of the second cross brace 50 such that the support assembly 38 supports the front frame section 14 in a cantilevered fashion as shown in FIGS. 3 and 4.

Hinges 56 and 57, as illustrated, certainly meet the requirements of the present invention. However, alternative hinge arrangements may also be employed without deviating from the invention. For example, a single axle passing through the second and fourth upright hollow supports 42 and 46 of the support assembly 38 and the first and second rails 70 and 72 could be employed. Virtually any hinge arrangement enabling the front frame section 14 to pivot from its folded position to its deployed position could suitably be employed. Likewise, stops other than the tops of the first and second cross braces 48 and 50 could be employed to hold the front frame 14 in a deployed cantilevered fashion without deviating from the invention.

As noted above, the frame of cart 10 also has a rear frame section 16. Rear frame section 16 comprises first and second hollow channel beams 80 and 84. The back ends 82 and 85 of the hollow channel beams 80 and 84 are open for reasons discussed below. Hinges 35 and 36 couple the front ends 83 and 86 of channel beams 80 and 84 to the rear ends of the first and second longitudinal frame members 26 and 28 of the middle frame section 12. These hinges 35 and 36 permit the rear frame section to be pivoted between the folded position illustrated in FIGS. 1 and 2 in which the rear frame section 16 overlies the middle frame section 12 and the deployed position illustrated in FIG. 3. When the rear frame section is in the deployed position, the first channel beam 80 extends from the first longitudinal frame member 26 at substantially a 180° angle. Likewise, the second channel beam 84 extends from the second longitudinal frame member 28 at substantially a 180° angle. A locking mechanism, which may be part of the hinges 35 and 36 such as 110 and 112, is employed to secure the channel beams and longitudinal frame members at this angle. The locking means may also be selectively employed to fix the channel beams to the longitudinal frame members at any other desired angle. Combination hinges and locks like those used commercially on Little Giant Ladder Systems work well for this purpose. Alternatively, the lock can be in the form of plates extending from the first and second longitudinal frame members 26 and 28 upon which the first and second channel beams 80 and 84 rest when in the extended position and pins or clamps which couple the plates to the channel beams.

Figure 5:
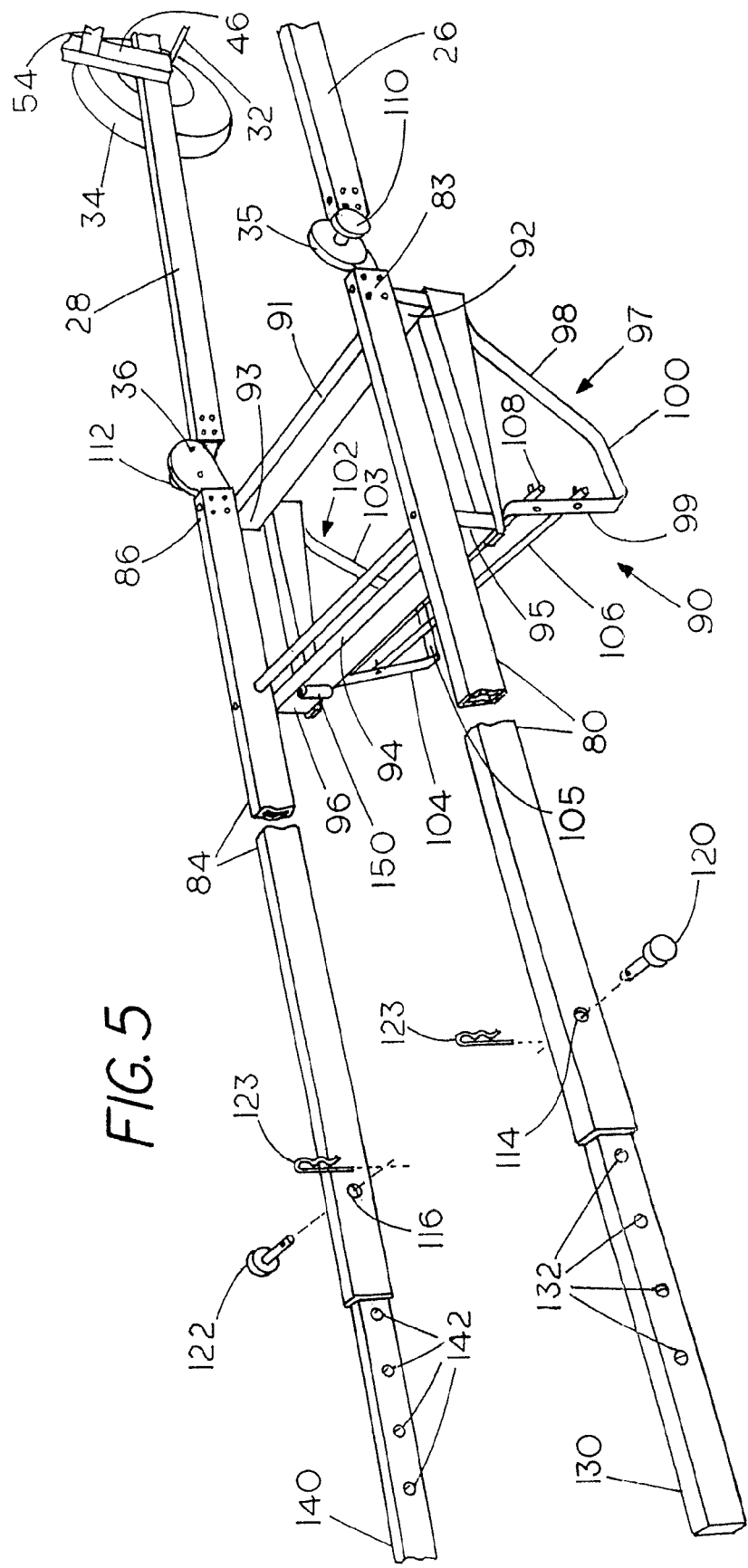
FIG. 5 is a perspective view showing the rear portion of the cart of FIG. 1.

When the rear frame assembly is in its deployed position and the cart 10 is at rest as illustrated in FIGS. 3 and 5, the frame of cart 10 is supported above the ground by a wheel assembly 31 and a leg assembly 90. The wheel assembly 31 is coupled to the front 22 of base 20 of the middle frame section 12. The leg assembly 90 is coupled to the front ends 83 and 86 of the channel beams 80 and 84 of the rear frame section 16.

More specifically, the wheel assembly 31 includes an axle 32 coupled to the first and second longitudinal frame members 26 and 28 proximate their front ends. A first wheel 33 is mounted for rotation about the axle 32 outside of the first longitudinal frame member 26. A second wheel 34 is mounted for rotation about the axle 32 outside the second longitudinal frame member 28. This arrangement provides the cart 10 with improved stability. To reduce the width of cart 10, the wheels 33 and 34 could be mounted between the longitudinal frame members 26 and 28. Also, one wheel mounted at the center of the axle, rather than the two wheels shown, could be employed.

The illustrated leg assembly 90 includes a first cross brace 91 having a first end 92 and a second end 93. End 92 of cross brace 91 is secured to the first channel beam 80 near its front end 83. End 93 of the cross brace 91 is secured to the second channel beam 84 near its front end 86. The leg assembly also includes a second cross brace 94 having ends 95 and 96 similarly secured to the channel beams 80 and 84. These cross braces serve to retain in a spaced generally parallel relation not only the channel beams 80 and 84, but also the longitudinal frame members 26 and 28. The leg assembly also includes a first leg 97 and a second leg 102. Leg 97 has a generally V-shape and includes a first straight leg portion 98, a second straight leg portion 99 and a curved section 100 joining the bottoms of the straight leg portions 98 and 99. The top of straight leg portion 98 is fastened to the first cross brace 91 and the top of straight leg portion 99 is fastened to the second cross brace 94. Leg 102 likewise has a first straight leg portion 103, the top of which is fastened to the first cross brace 91, a second straight leg portion 104, the top of which is fastened to the second cross brace 94, and a curved section 105 joining the bottom of the straight leg portions 103 and 104. As illustrated, the legs 97 and 102 are spaced from each other such that leg 97 is mounted at or near the first ends 92 and 95 of cross braces 91 and 94 and the second leg 102 is mounted near the second ends 93 and 96 of the cross braces 91 and 94. This helps stabilize the cart 10 and its load of lumber, sheet rock, carpet, pipe, or other construction materials when the wheels 33 and 34 and legs 97 and 102 engage the ground. To strengthen the leg assembly 90, braces such as 106 and 108 can be employed such that the opposite ends of the braces are connected to the legs 97 and 102.

Cart 10, as illustrated, has a handle assembly comprising first and second elongate handles 130 and 140. The handles 130 and 140 are shown in their retracted position in FIGS. 1 and 3 and in an extended position in FIG. 5. Handle 130 has a first end located within hollow channel beam 80 and a second end extending rearwardly of channel beam 80. Handle 140 has a first end located within the hollow channel beam 84 and a second end extending rearwardly of channel beam 84. The cross sections of the channel beams 80 and 84 and the handles 130 and 140 are such that the handles can be independently moved (or telescoped) between an extended position (see FIG. 5) wherein much of the handle is exposed and a retracted position (see FIGS. 1 and 3) in which most of the elongated handle is within the associated channel member.

Separate locking arrangements are employed to secure the handles with a desired portion exposed. Specifically, the first channel beam 80 has one or more transverse apertures 114 extending through the channel beam 80. Handle 130 also has one or more transverse holes 132 extending through handle 130. When the desired portion of the handle 130 is exposed and a transverse aperture 114 of the first channel beam 80 is aligned with a transverse hole 132 of the handle 130, a first locking pin 120 is inserted through the aligned transverse aperture and transverse hole to secure the handle 130 in the desired position relative to the first channel beam 80. A cotter pin 123 or the like may be employed to ensure the pin does not fall out of the aligned hole 132 and aperture 114. Similarly and independently, the second channel beam 84 is provided with one or more transverse apertures 116 and the second handle 140 is provided with one or more transverse holes 142. The handle is retracted or extended to a desired length such that an aperture 116 and a hole 142 are aligned and a second locking pin 122 is inserted through the aligned hole and aperture. If the pin is threaded, a nut can be used to ensure the pin does not fall out. Otherwise, a cotter pin 123 or any other suitable securement mechanism may be employed. The independent nature of the handles 130 and 140 and locking arrangements permits the exposed length of the handles to be adjusted independently. When the rear frame section 16 is in its folded position, the handles 130 and 140 are retracted into the channel beams 80 and 84. When the rear frame section 16 is in its deployed position, the handles 130 and 140 are extended from the channel beams 80 and 84.

Supports of various configuration can be coupled to the frame of cart 10 to vertically and laterally support loads of differing construction materials. To provide greater flexibility, various pockets or receivers are provided on different parts of the frame. For example, and to provide vertical support for the load, the tops 41, 43, 45 and 47 of the upright hollow supports 40, 42, 44 and 46 of the support assembly are open and act as receivers for first and second removable support slings 60 and 64. As illustrated in FIG. 3, sling 60 has a transverse member 61 extending between and fixed to a first attachment member 62 and a second attachment member 63. Attachment member 63 is inserted into the top 41 of the first upright hollow support 40 and attachment member 62 is inserted into the top of the third upright support 44 to couple the sling 60 to the frame. Sling 64 likewise has a transverse member 67 coupled to and extending between a first attachment member 65 (which mates with the open top 47 of the fourth upright hollow support 46) and a second attachment member 66 (which mates with the open top 43 of the second upright hollow support 42).

As shown, the transverse members of the slings 60 and 64 are flat and straight. This arrangement is very suitable, for example, when transporting lumber used to construct decks, gazebos or the framing for a building. Without deviating from the invention, the transverse members 61 and 67 of the slings 60 and 64 may be concave when the cart 10 is being used to transport pipes, rolls of house wrap, carpet or other elongate construction items having a round or curved cross-section. Also, the sling can be stiff or somewhat flexible. While slings 60 and 64 are shown coupled to the upright supports of the support assembly 38, pockets for receiving the sling attachment members 62/63 can be formed in or secured to other portions of the frame to secure additional slings to other portions of the frame.

The drawings also illustrate how lateral support may be provided for a load of material place on and to be transported using cart 10. As shown, a plurality of pockets 150 having open tops are coupled to or formed in the frame at various locations. Lateral support posts 160 are inserted into and extend upwardly from selected pockets to laterally support the load. Both the support posts 160 and the slings 60 and 64 are removable and repositionable. Other support devices can be inserted into the pockets 150 to support windows, drywall or wallboard, plywood or the like on edge on the cart which may be necessary to transport such items on the cart through gates, doorways or the like since the width of the drywall or wallboard, plywood, windows or panels may be wider than the opening of the gate or doorway such that they should not be laid flat on the cart.

As shown, the lateral supports can be as simple as a member inserted into the pocket. Alternatively, the lateral supports can be designed to slide back and forth within the pocket between an extended and retracted position. The lateral supports can also be designed to have sections which telescope with respect to each other much like the legs of a camera tripod. The lateral supports may also be hinged and locked in extended and retracted positions like the legs of a card table. What is important is that adequate lateral support be provided for safe transport of the load, not how the supports are coupled to the frame.

Use of the cart 10 will now be described. With the cart 10 in its folded configuration, it is loaded into the bed of a standard pickup truck 2 and the tailgate 4 is then closed. This task can be easily performed by a single person given the weight of the cart 10. The cart 10 is then transported to the job site in the pickup truck 2.

Upon arrival at the job site, the cart 10 is removed from the pickup truck 2 and placed so the wheels 33 and 34 are on the ground. Again, the weight of the cart is such that one person can easily do so. The cart 10 is then unfolded. More specifically, the front section frame section 14 is rotated about hinges 56 and 57 from its folded position to its deployed position. When fully deployed, the bottoms of the first rail 70 and the second rail 72 engage the tops of cross braces 48 and 50 which act as a stop and retain the front frame section 14 in a cantilevered manner with respect to the support assembly 38 of the middle frame section 12.

Next, the rear frame section 16 is unfolded. More specifically, the rear frame section 16 is rotated about hinges 35 and 36 from its folded position to its deployed position and the channel beams 80 and 84 of the rear frame section 16 are locked in place at about a 180° angle (or any other desired angle) with respect to the first and second longitudinal frame members 26 and 28 of the middle frame section 12. The handles 130 and 140 are then telescopically extended from the channel beams 80 and 84 and locked in place using locking pins 120 and 122 which are inserted through aligned apertures in the channel beams and holes in the handles. Selective insertion of slings and/or lateral support pipes into the pockets completes the preparation of the cart for use.

With the cart supported by the wheels 33 and 34 and legs 97 and 102, construction materials are then placed on the cart for transport from one location at the job site to another. When the cart is loaded, a user lifts on the handles 130 and 140 until the bottom of legs 97 and 102 come off the ground. The user then pulls or pushes on the handles causing the cart and its load to move. When the desired location is reached, the user sets the cart 10 down on legs 97 and 102 and the cart is either unloaded or used to store the materials off the ground until they are ready for use.

Various features of the invention have been shown and described to meet the disclosure requirements of the patent laws. The foregoing description and the accompanying drawings are intended to be illustrative and not limiting. The invention is confirmed only to the broadest scope consistent with the following claims and the full range of equivalents.

What is claimed:

1. A cart for transporting building materials, said cart comprising:
   a. a middle frame section having a base and a support assembly, the base having a front end and a back end and comprising first and second spaced apart longitudinal frame members extending from the front end to the back end of the base, the support assembly extending upwardly from the base near the front end of the base;
   b. a front frame section comprising a pair of rails and at least one brace, each rail having a back end pivotally connected to the support assembly and a front end coupled to the brace, wherein the front frame section is pivotal between a folded position in which the front frame section overlies the middle frame section and a deployed position in which the front frame section extends from and in front of the middle frame section;
   c. a rear frame section comprising first and second spaced apart channel beams and at least one brace spanning the distance between the channel beams, each channel beam being hollow and having an open back end, each channel beam also having a front end pivotally connected to the back end of the base of the middle frame section, wherein the rear frame section is pivotal between a folded position in which the rear frame section overlies the middle frame section and a deployed position in which the rear frame section extends from and behind the middle frame section;
   d. at least one rotatable wheel mounted to the middle frame section near the front end of the base;
   e. a leg assembly coupled to rear frame section, the leg assembly and rotatable wheel cooperating to support the cart when the cart is at rest and the rear frame section is in its deployed position; and
   f. a handle assembly including a first handle member received in and extending rearward from the first channel beam of the rear frame section and a second handle member received in and extending rearward from the second channel beam of the rear frame section.

2. The cart of claim 1 further including a first lock assembly which selectively secures the rear frame section in its deployed position.

3. The cart of claim 1 wherein each handle member of the handle assembly is independently adjustable to extend various lengths rearward of the rear frame section.

4. The cart of claim 1 further including at least one aperture extending transversely through one of the longitudinal spaced apart channel beams, at least one hole extending through the handle member received in said longitudinal spaced apart channel beam, and a pin inserted through said at least one aperture and said at least one hole when said at least one aperture and said at least one hole are aligned to lock the handle member at a desired length rearward of the rear frame section.

5. The cart of claim 1 wherein the support assembly comprises a first subassembly including a first upright support and a second upright support each fastened to and extending upwardly from the first longitudinal frame member and a first cross brace extending between the first and second upright supports, a second subassembly including a third upright support and a fourth upright support each fastened to and extending upwardly from the second longitudinal frame member and a second cross brace extending between the third and fourth upright supports, a third cross brace extending between the first upright support and the third upright support, and a fourth cross brace extending between the second upright support and the fourth upright support.

6. The cart of claim 1 wherein the leg assembly includes a pair of cross braces extending between the channel beams of the rear frame section, each of cross braces having a first end secured to one of the channel beams and an second end secured to the other of the channel beams, a first leg coupled to each of the cross braces near the first end of the cross braces, and a second leg coupled to each of the cross braces near the second end of the cross braces.

7. The cart of claim 1 further comprising a plurality of pockets with open tops attached to at least one of the front frame section, the middle frame section and the rear frame section, and a confinement member having an end inserted into one of the pockets and extending upwardly from said pocket.

8. The cart of claim 1 further includes at least one removable material support assembly comprising a transverse member having opposite ends, a first attachment member coupled to one of the ends on the transverse member, and a second attachment member coupled to the other end of the transverse member.

9. The cart of claim 8 further including a first open top pocket attached to one of the rails of the front frame section and a second open top pocket attached to the other of the rails of the front frame section and wherein a portion of the first attachment member is received within the first open top pocket and a portion of the second attachment member is received within the second open top pocket.

10. The cart of claim 1 wherein when the rear frame section is in its deployed position, the channel beams of the rear frame section extend from the longitudinal frame members of the middle frame section at about a 180 degree angle.

11. The cart of claim 10 wherein when the cart is supported on a level surface by the wheel and the leg assembly, the front of the front end of the base of the middle frame section is lower than the handles.

12. The cart of claim 1 wherein when the cart is supported on a level surface by the wheel and the leg assembly and the front frame section is in its deployed position, the rails extend generally parallel to the level surface.

13. The cart of claim 1 wherein the width of the cart at its widest point is less than 42 inches wide.

14. The cart of claim 1 wherein the length of the cart exceeds 15 feet when the front frame section and rear frame section are in their deployed positions and the handles are extended.

15. The cart of claim 1 including a pair of wheels coupled to the opposite ends of an axle located near the front end of the base of the middle frame section.

16. A cart for transporting building materials, said cart comprising:

a. a middle frame section comprising (i) a first longitudinal frame member having a front end and a back end; (ii) a second longitudinal frame member having a front end and a back end; and (iii) a support assembly comprising at least four upright hollow supports, each having an open top, and four cross braces, wherein the first and second of said supports are fastened to and extend upwardly from the first longitudinal frame member, the third and fourth of said supports are fastened to and extend upwardly from the second longitudinal frame member, the first cross brace extends between the first and second upright supports, the second cross brace extends between the third and fourth upright supports, the third cross brace extends between the first and the third upright supports, and the fourth cross brace extends between the second and fourth upright supports;

b. a front frame section comprising first and second rails and at least one brace, the first rail having a back end pivotally connected to the second support of support assembly and a front end coupled to the brace and the second rail having a back end pivotally connected to the fourth support of the support assembly and a front end coupled to the brace, wherein the front frame section is pivotal between a folded position in which the front frame overlies the middle frame section and a deployed position in which the front frame section extends from and in front of the middle frame section, the first rail is supported by the first cross brace of the support assembly, the second rail is supported by the second cross brace of the support assembly;

c. a rear frame section comprising a first and second spaced apart channel beams and at least one brace spanning the distance between the channel beams, each channel beam being hollow and having an open back end, the first channel beam having a front end pivotally connected to the back end of the first longitudinal frame member of the middle frame section and the second channel beam having a front end pivotally connected to the back end of the second longitudinal frame member of the middle frame section, wherein the rear frame section is pivotal between a folded position in which the rear frame section overlies the middle frame section and a deployed position in which the rear frame section extends from and behind the middle frame section such that the first channel beam extends from the first longitudinal member at an angle of about 180 degrees and the second channel member extends from the second longitudinal member at an angle of about 180 degrees;

d. a transverse axle coupled to the middle frame section near the front end of the first and second longitudinal frame members;

e. a pair of wheels coupled to the axle for rotation about the axle;

f. a leg assembly coupled to rear frame section, the leg assembly comprising a pair of cross braces extending between the channel beams of the rear frame section, each of cross braces having a first end secured to one of the channel beans and an second end secured to the other of the channel beams, a first leg coupled to each of the cross braces near the first end of the cross braces, and a second leg coupled to each of the cross braces near the second end of the cross braces, the leg assembly cooperating with the wheels to support the cart when the cart is at rest and the rear frame section is in its deployed position;

g. a lock assembly which selectively secures the rear frame section in its deployed position; and h. a handle assembly including a first handle member received in and extending rearward from the first channel beam of the rear frame section and a second handle member received and extending rearward from the second channel beam of the rear frame section, wherein each handle member of the handle assembly is independently adjustable to extend various lengths rearward of the rear frame section.

17. The cart of claim 16 further including at least one aperture extending transversely through one of the longitudinal spaced apart channel beams, at least one hole extending through the handle member received in said longitudinal spaced apart channel beam, and a pin inserted through said at least one aperture and said at least one hole when said at least one aperture and said at least one hole are aligned to lock the handle member to the channel beam.

18. The cart of claim 16 further including first and second removable material support slings each of the support slings comprising a transverse member having opposite ends, a first attachment member coupled to one of the ends on the transverse member, and a second attachment member coupled to the other end of the transverse member, wherein the first removable material support sling is selectively coupled to the middle frame section by mating the first and second attachment members of the first removable material support sling to the open tops of the first and third upright hollow supports of the support assembly and the second removable material support sling is selectively coupled to the middle frame section by mating the first and second attachment members of the second removable material support sling to the open tops of the second and fourth upright hollow supports of the support assembly.

19. The cart of claim 16 further including a plurality of pockets coupled to at least one of the frame sections and a plurality of lateral material support posts wherein the pockets and posts are sued and shaped to permit the ends of posts to be inserted into the pockets.

* * * * *